(12) United States Patent
Wang et al.

(10) Patent No.: US 10,801,080 B2
(45) Date of Patent: Oct. 13, 2020

(54) HIGH-TEMPERATURE LIQUID SLAG GRANULATING SYSTEM

(71) Applicant: XI'AN JIAOTONG UNIVERSITY, Xi'an, Shaanxi (CN)

(72) Inventors: Shuzhong Wang, Shaanxi (CN); Zhiqiang Wu, Shaanxi (CN); Lin Chen, Shaanxi (CN); Pengfei Yu, Shaanxi (CN); Haiyu Meng, Shaanxi (CN); Zhongqing Zhang, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 128 days.

(21) Appl. No.: 16/083,824

(22) PCT Filed: Feb. 24, 2017

(86) PCT No.: PCT/CN2017/074805
§ 371 (c)(1),
(2) Date: Sep. 10, 2018

(87) PCT Pub. No.: WO2017/152783
PCT Pub. Date: Sep. 14, 2017

(65) Prior Publication Data
US 2019/0071741 A1 Mar. 7, 2019

(30) Foreign Application Priority Data
Mar. 11, 2016 (CN) .......................... 2016 1 0141188

(51) Int. Cl.
*C21B 3/06* (2006.01)

(52) U.S. Cl.
CPC .......... *C21B 3/06* (2013.01); *C21B 2400/026* (2018.08); *C21B 2400/028* (2018.08); *C21B 2400/034* (2018.08); *C21B 2400/052* (2018.08); *Y02P 10/212* (2015.11); *Y02P 10/242* (2015.11); *Y02W 30/543* (2015.05)

(58) Field of Classification Search
CPC ........ C21B 2400/028; C21B 2400/034; C21B 2400/052; C21B 3/06
USPC ...... 266/137; 75/331, 333, 334; 65/19, 21.2, 65/141, 142
See application file for complete search history.

(56) References Cited

U.S. PATENT DOCUMENTS

| | | | |
|---|---|---|---|
| 2,308,769 A * | 1/1943 | Meinzer | C21B 3/08 65/20 |
| 4,995,894 A * | 2/1991 | Spencer | C03B 19/1045 65/19 |
| 5,409,521 A * | 4/1995 | Featherstone | C21B 3/08 75/334 |
| 5,735,931 A * | 4/1998 | Featherstone | C21B 3/08 75/334 |

\* cited by examiner

*Primary Examiner* — Jessee R Roe
*Assistant Examiner* — Michael Aboagye

(57) ABSTRACT

A liquid slag granulating system includes a granulator (1), a granulator connecting part and a granulator drive part. The granulator (1) is disc-shaped or cup-shaped, and a diversion cone is arranged at a center of the granulator (1). The granulator drive part drives the granulator to rotate, thus granulating liquid slag. The system further includes an air supply part.

6 Claims, 2 Drawing Sheets

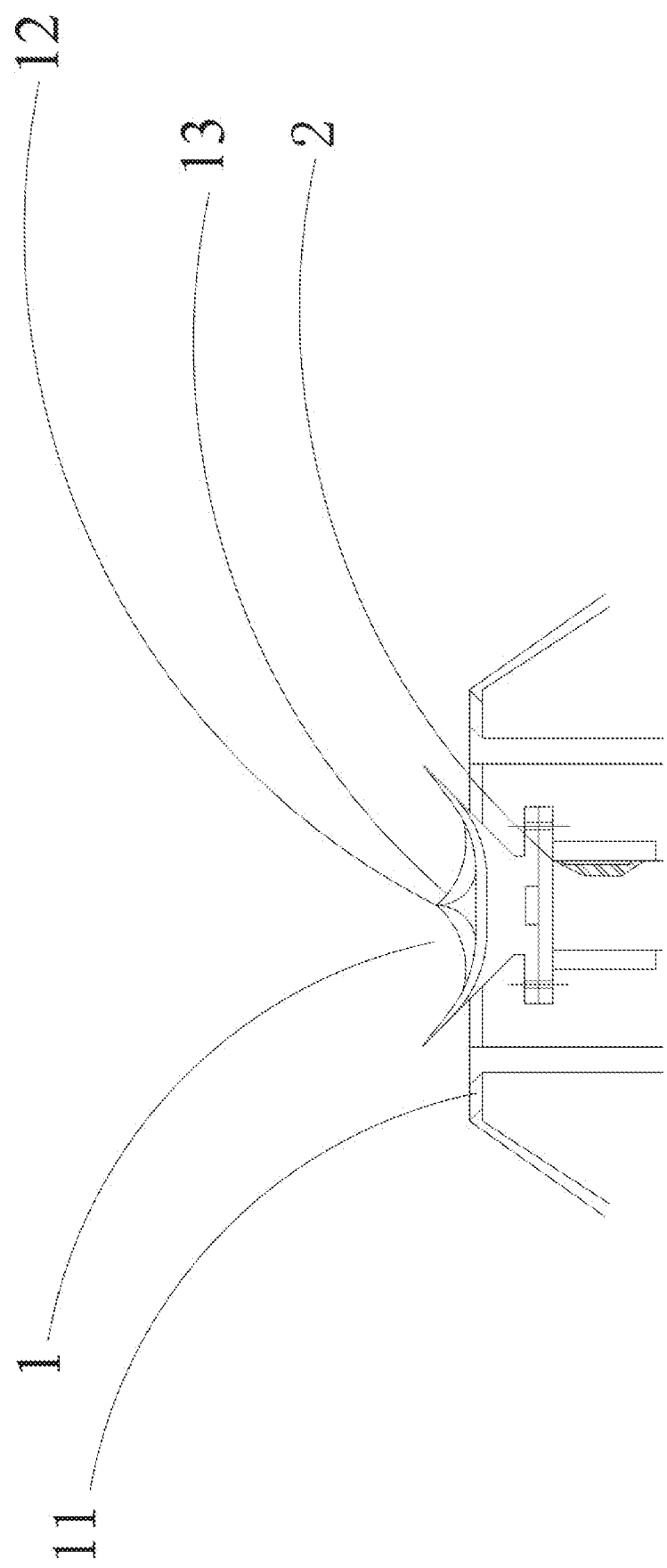

HIGH-TEMPERATURE LIQUID SLAG GRANULATING SYSTEM

CROSS REFERENCE OF RELATED APPLICATION

This is a U.S. National Stage under 35 U.S.C 371 of the International Application PCT/CN2017/074805, filed Feb. 24, 2017, which claims priority under 35 U.S.C. 119(a-d) to CN 201610141188.0, filed Mar. 11, 2016.

BACKGROUND OF THE PRESENT INVENTION

Field of Invention

The present invention relates to the field of high-temperature liquid slag waste heat recovery technology, and more particularly to a high-temperature liquid slag granulating system.

Description of Related Arts

China is currently the world's largest steel producer, and steel production has been the world's number one for 17 consecutive years. In 2014, China's pig iron production reached 711 million tons, accounting for about 60% of the total world production. In the process of smelting pig iron, blast furnace slag containing huge heat is also produced. The blast furnace slag is generally discharged at a temperature in a range of 1400° C. to 1550° C., and contains (1260 to 1880)×$10^3$ kJ of sensible heat per ton of slag, which is equivalent to 60 kg of standard coals. Under the existing ironmaking technology in China, 0.3 ton of blast furnace slag is produced per producing 1 ton of pig iron, so it is calculated by the current production of pig iron in China of 711 million tons, that more than 213 million tons of blast furnace slag are produced, whose sensible heat is equivalent to 12.78 million tons of standard coals.

The dry slag pit cooling method and the water slag method are the most common blast furnace slag treatment methods in China. The dry slag pit cooling method directly discharges the high-temperature liquid slag into the dry slag pit to be air-cooled, and assists in water cooling. The method generates a large amount of water vapors when cooling and simultaneously releases a large amount of $H_2S$ and $SO_2$ gases, which corrodes buildings, damages equipment, and deteriorates the working environment. Generally, the method is used only in accident handling. 90% of blast furnace slag in China is treated by the water slag method. The water slag method refers to directly mixing the low-temperature cooling water with the high-temperature liquid slag, so that the temperature of the liquid slag is rapidly reduced and the vitreous slag particles are formed. The water slag method can be divided into INBA method, TYNA method, OCP method, RASA method and MTC method according to different process flows. Although the water slag process continues to develop, the core of the technology is to spray and water quenching the high-temperature liquid slag for achieving cooling and granulation, and then to separate water from slag, the water for washing the slag is recycled after precipitating filtration. Although the vitreous slag produced by this method can be used in the cement industry for resource utilization, the process wastes a lot of water resources, generates harmful gases such as $SO_2$ and $H_2S$, and cannot effectively recover high-quality waste heat resources contained in high-temperature liquid slag.

In summary, the commonly used dry slag pit cooling method and water slag method not only waste all the high-quality waste heat resources contained in the high-temperature liquid slag, but also consume a lot of water resources and cause serious pollution to the environment. These methods can no longer meet the urgent needs of energy saving and emission reduction in the current steel industry. Efficient, non-polluting new technologies must be sought to effectively recycle liquid slag resources.

SUMMARY OF THE PRESENT INVENTION

An object of the present invention is to provide a high-temperature liquid slag granulating system, which has uniform granulation and high heat recovery efficiency, and is able to recover heat of liquid slag without pollution.

To achieve the above object, the present invention provides a technical solution as follows.

A high-temperature liquid slag granulating system comprises a granulator, a granulator connecting part and a granulator drive part, wherein: the granulator is disc-shaped or cup-shaped, a diversion cone is arranged at a center of the granulator, fins are arranged between the diversion cone and an outer edge of the granulator; the granulator is connected with the granulator drive part through the granulator connecting part, the granulator drive part is configured to drive the granulator to rotate through the granulator connecting part so as to granulate the liquid slag which flow into the granulator into small droplets.

Further, the granulator connecting part comprises a granulator base, a shaft and two thrust bearings, wherein the granulator is fixedly connected with the granulator base, the granulator base is fixedly connected with the shaft, the shaft is fixed with a shaft sleeve through the two thrust bearings and simultaneously connected with the granulator drive part through a coupling.

Further, an angle between an outer edge of an upper surface of the granulator and a horizontal plane is in a range of 15 to 60 degrees.

Further, the high-temperature liquid slag granulating system comprises an air supply part, wherein the air supply part comprises an air duct outer sleeve and an air duct inner sleeve which are different from each other in outer diameter, the shaft sleeve is fixed with the air duct inner sleeve through an annular end cover at a bottom of the shaft sleeve; and an annular air port is provided at a top portion of the air supply part.

Further, the annular air port is located at an outer periphery of the granulator, an air-out angle of the annular air port is as same as the angle of the granulator, that is, the air-out angle between an air-out direction of the annular air port and the horizontal plane is in the range of 15 to 60 degrees.

Further, the annular air port is located below the outer edge of the granulator.

Further, the shaft sleeve has cooling air holes at two sides of the two thrust bearings.

Compared with the prior art, the present invention has beneficial effects as follows.

(1) In the present invention, the annular wind can strengthen the edge disturbance of the revolving cup for enhancing the granulation effect.

(2) In the present invention, the annular wind can accelerate the convective heat transfer of the liquid slag particles for accelerating the cooling rate and increasing the glass phase ratio.

(3) In the present invention, the sleeve structure can utilize the annular wind to strengthen the cooling of the motor shaft for preventing the motor from being overheated.

(4) In the present invention, the annular end cover can effectively reduce the air backflow in the granulation bin to atmosphere and the pollution to the external environment.

(5) In the present invention, the suspension structure of the motor can effectively avoid the thermal stress caused by inconsistent thermal expansion directions.

(6) In the present invention, the backflow cone can effectively reduce the impact force of the slag.

BRIEF DESCRIPTION OF THE DRAWINGS

The present invention is further described with accompanying drawings and embodiments in detail as follows.

FIG. 2 is a partial enlarged diagram of Section A of FIG. 1.

Figure 1:
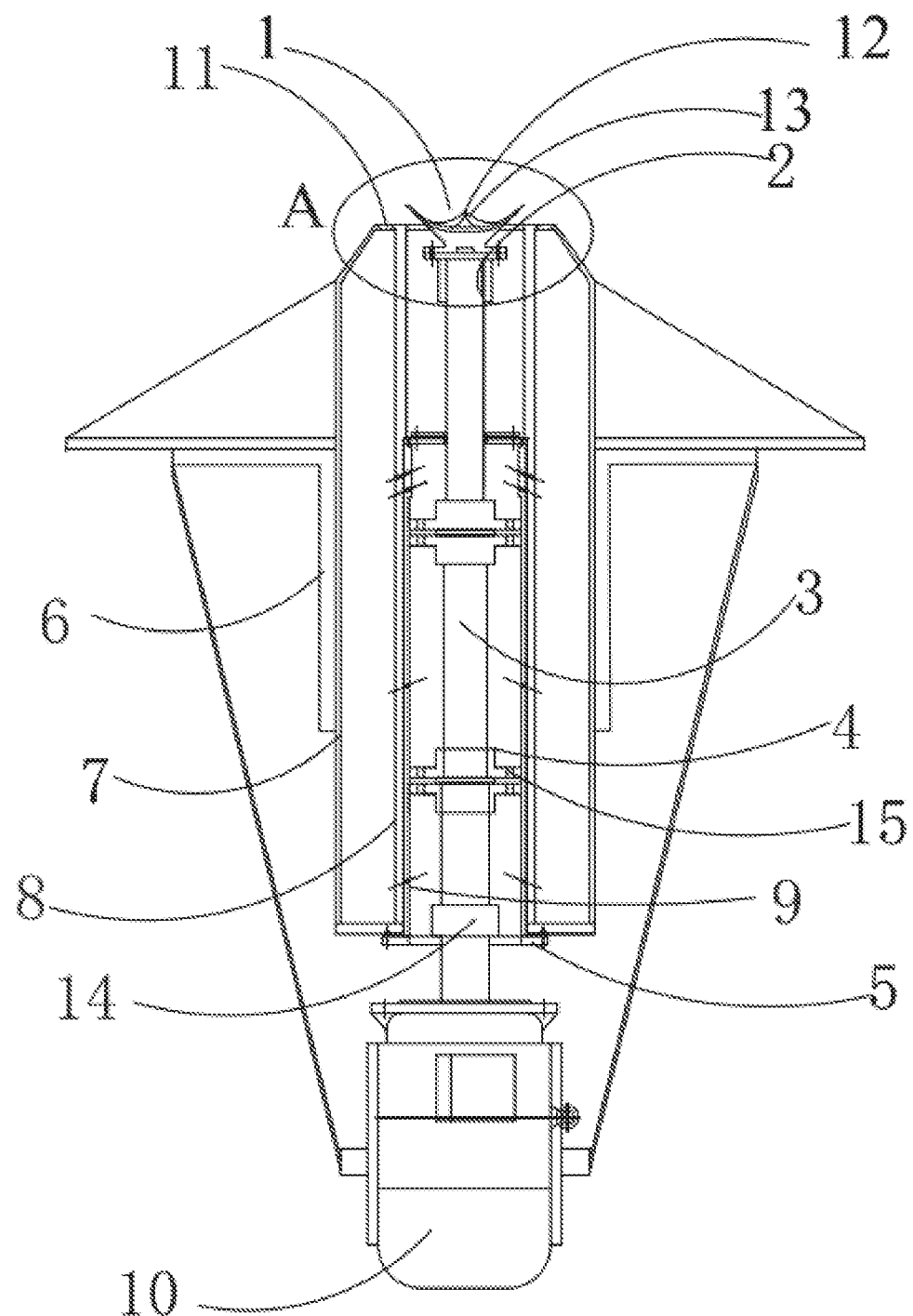
FIG. 1 is a schematic view of a granulating device for granulating liquid slag and recovering part of heat.

In the drawing, 1: granulator; 2: granulator base; 3: shaft; 4: thrust bearing; 5: annular end cover; 6: fixing sleeve and plate; 7: air duct outer sleeve; 8: air duct inner sleeve; 9: shaft sleeve; 10: motor; 11: annular air port; 12: diversion cone; 13: fin; 14: coupling; 15: cooling air hole.

DETAILED DESCRIPTION OF THE PREFERRED EMBODIMENT

Referring to the drawings, a high-temperature liquid slag granulating system is illustrated, which comprises a granulator 1, a granulator connecting part, a granulator drive part, an air supply part and an auxiliary device.

The granulator 1 is disc-shaped or cup-shaped, a diversion cone 12 is arranged at a center of the granulator 1, fins 13 are arranged between the diversion cone and an outer edge of the granulator 1; an angle between an outer edge of an upper surface of the granulator 1 and a horizontal plane is in a range of 15 to 60 degrees; the granulator connecting part comprises a granulator base 2, a shaft 3 and two thrust bearings 4; the granulator 1 is connected with the granulator base 2 through bolts, the granulator base 2 is connected with the shaft 3 through bonds; the shaft 3 is connected with a shaft sleeve 9 through the thrust bearings 4, and simultaneously connected with a motor 10 through a coupling 14; the air supply part comprises an air duct outer sleeve 7 and an air duct inner sleeve 8 coaxially aligned with the air duct outer sleeve 7 both of which are different from each other in outer diameter, the shaft sleeve 9 is fixed with the air duct inner sleeve 8 through an annular end cover 5 at a bottom of the shaft sleeve 9; an external wall of the air duct outer sleeve 7 is fixed with a fixing sleeve and plate 6; an annular air port 11, provided at a top portion of the air supply part, is located at an outer periphery of the granulator 1, an air-out angle of the annular air port is as same as the angle of the granulator, that is, the air-out angle between an air-out direction of the annular air port and the horizontal plane is in the range of 15 to 60 degrees.

Both the air duct inner sleeve 8 and the shaft sleeve 9 have the annular air port, and the shaft sleeve 9 has cooling air holes 15 at two sides of the two thrust bearings 4.

The liquid slag in the slag ladle enters the granulation bin with a certain amount of rate of flow through the slag pipe under the control of the stopper rod, and falls on the granulator 1, and the high-speed rotating granulator 1 granulates the liquid slag which flows into the revolving cup into small droplets, the small droplets splash into the large space of the granulation bin; during the flight of small droplets, under the double cooling effect of the heating surface of the granulation bin and the annular wind of the granulator, the small droplets become slag particles with a hard outer surface It should be noted that the above embodiment is only for illustrating the present invention and is not intended to limit the technical solution described in the present invention; therefore, although the present specification has been described in detail with reference to the various embodiments described above, it should be understood by those skilled in the art that the present invention may be modified or equivalently substituted; and all the technical solutions and improvements without departing from the spirit and scope of the present invention should be included in the scope of the claims of the present invention.

What is claimed is:

1. A liquid slag granulating system, comprising a granulator (1), a granulator connecting part, a motor (10) and an air supply part, wherein:

the granulator (1) is disc-shaped or cup-shaped, a diversion cone (2) is arranged at a center of the granulator, fins (13) are arranged between the diversion cone and an outer edge of the granulator;

the granulator (1) is connected with the motor (10) through the granulator connecting part, the motor (10) is configured to drive the granulator (1) to rotate through the granulator connecting part so as to granulate liquid slag which flows into the granulator (1) into droplets;

the air supply part comprises an air duct outer sleeve (7) and an air duct inner sleeve (8) coaxially aligned with the air duct outer sleeve 7 both of which are different from each other in outer diameter, a shaft sleeve (9) is fixed with the air duct inner sleeve (8) through an annular end cover (5) at a bottom of the shaft sleeve (9); an annular air port (11) is provided at a top portion of the air supply part.

2. The liquid slag granulating system, as recited in claim 1, wherein: the annular air port (11) is located at an outer periphery of the granulator (1), an air-out angle between an air-out direction of the annular air port (11) and a horizontal plane is in a range of 15 to 60 degrees.

3. The liquid slag granulating system, as recited in claim 1, wherein: the annular air port (11) is located below an outer edge of the granulator.

4. The liquid slag granulating system, as recited in claim 1, wherein: the shaft sleeve has cooling air holes (15) at two sides of the two thrust bearings (4).

5. The liquid slag granulating system, as recited in claim 1, wherein: the granulator connecting part comprises a granulator base (2), a shaft (3) and two thrust bearings (4); the granulator (1) is fixedly connected with the granulator base (2), the granulator base (2) is fixedly connected with the shaft (3), the shaft (3) is fixed with a shaft sleeve (9) through the two thrust bearings (4) and simultaneously connected with the motor (10) through a coupling (14).

6. The liquid slag granulating system, as recited in claim 1, wherein: an angle between an outer edge of an upper surface of the granulator (1) and a horizontal plane is in a range of 15 to 60 degrees.

* * * * *